United States Patent [19]

Plate

[11] Patent Number: 5,052,532
[45] Date of Patent: Oct. 1, 1991

[54] VEHICLE BRAKE SYSTEM

[75] Inventor: John R. Plate, Milwaukee, Wis.

[73] Assignee: Trak International, Inc., Port Washington, Wis.

[21] Appl. No.: 529,926

[22] Filed: May 29, 1990

[51] Int. Cl.[5] .............................................. F16D 67/04
[52] U.S. Cl. ..................................... 192/4 A; 192/8 R
[58] Field of Search ........................ 192/4 A, 4 R, 8 R

[56] References Cited

U.S. PATENT DOCUMENTS

| 2,220,620 | 11/1940 | Capen | 192/4 A |
| 3,941,007 | 3/1976 | Webber et al. | 192/4 A X |
| 4,227,598 | 10/1980 | Luft | 192/4 A |
| 4,284,182 | 8/1981 | Hakes et al. | 192/4 A |

OTHER PUBLICATIONS

Allis-Chalmers Service Manual, Part No. 9005321, Model 8010-8030-8050-8070 Tractors, Aug. 1982.
Mico Brake Actuators brochure.
Bendix Power Brakes for Medium and Medium-Heavy Vehicles, Bendix Automotive Control Systems Group, No., 1985.
Bendix Hydri-Boost Power Brake, Bendix Automotive Control Systems Group, Nov., 1985.

Primary Examiner—Allan D. Herrmann
Assistant Examiner—Nicholas Whitelaw
Attorney, Agent, or Firm—Michael, Best & Friedrich

[57] ABSTRACT

A brake system for a vehicle includes a pump coupled to a service brake through a brake pedal valve and to a parking brake by a four-way solenoid valve which also couples the pump to a transmission disconnect valve. Activation of the solenoid valve couples the parking brake to the pump for placing the parking brake in an off mode and actuates the transmission disconnect valve to couple a transmission pump to a transmission valve. Deactivation of the solenoid valve disconnects the parking brake and operates the transmission disconnect valve to disconnect the transmission so that the vehicle cannot be driven when the parking brake is on. A check valve connects the parking brake to the brake pedal valve so that the service brake can be operated when the pump is deactivated.

19 Claims, 1 Drawing Sheet

VEHICLE BRAKE SYSTEM

BACKGROUND OF THE INVENTION

This invention relates to motor vehicles and more particularly to a brake system for motor vehicles.

Utility vehicles, such as forklifts, cranes, shovels, backhoes, trenchers and the like generally include an engine for driving the vehicle and for operating the attached equipment. Such vehicles commonly include hydraulically operated parking and service brakes wherein hydraulic pressure is provided by a pump driven from the main engine. In the event of an engine failure, the loss of hydraulic pressure renders the service brakes of some prior art systems inoperable. Another problem is that some prior art vehicles can be driven while the parking brake is set, thereby causing inordinate brake wear.

SUMMARY OF THE INVENTION

It is an object of the invention to provide a new and improved braking system for utility vehicles and the like.

Another object of the invention is to provide a vehicle brake system wherein flow of hydraulic fluid to the transmission is interrupted and the vehicle cannot be driven when the parking brake is set.

A further object of the invention is to provide a braking system for vehicles wherein the service brakes can be operated in the event of a loss of hydraulic pressure.

In general terms, the invention comprises brake means for a vehicle having an engine and transmission means for transferring power from the engine to drive wheel means. The invention includes a source of hydraulic pressure, parking brake means, a first valve means for coupling and uncoupling the parking brake means relative to the pressure source. The first valve means has a first mode for setting the parking brake means and a second mode for releasing the parking brake means. Second valve means is coupled to the transmission means and to the first valve means and has a first mode for disabling the transmission means and a second mode for enabling the transmission means. The first valve means is operative for setting the second valve means in its first mode when the parking brake is set and for setting the second valve means in its second mode when the parking brake is released.

The vehicle may also include hydraulically actuated brake means and third valve means for coupling the hydraulic pressure source to the hydraulically operated brake means and the parking brake means may include a hydraulic cylinder. According to one of its more specific aspects, the invention includes means connecting the hydraulic cylinder to the third valve means when the source of hydraulic pressure fails so that the hydraulically actuated brake means may be operated.

DETAILED DESCRIPTION OF THE PREFERRED EMBODIMENT

Figure 1:
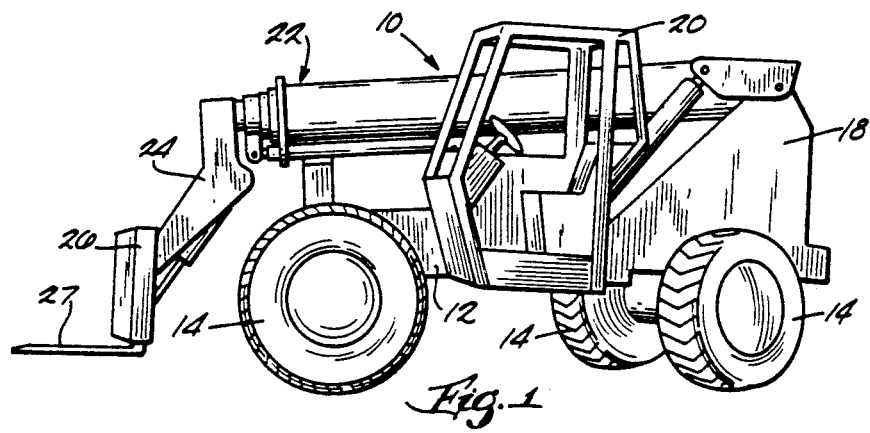
FIG. 1 is a perspective view of a utility vehicle in which the present invention may be incorporated.

FIG. 1 shows, by way of example, a fork lift vehicle 10 in which the hydraulic braking system of the invention may be employed. It will be appreciated, however, that the system according to the invention has application to other types of vehicles as well. The vehicle 10 includes a main frame 12 supported on wheels 14. The wheels 14 are driven by an engine (not shown) but disposed within an engine compartment 18 located adjacent the rear of frame 12. An operator cab 20 is disposed intermediate the ends of frame 12 and includes various conventional control levers, pedals, switches, gauges, a steering wheel and the like, all of which are well known in the art. A boom 22, which includes telescoping sections, is pivotally mounted at one end on frame 12 and carries a downwardly extending support 24 for a carriage which, in turn, supports a fork 27 or other load engaging structure.

Figure 2:
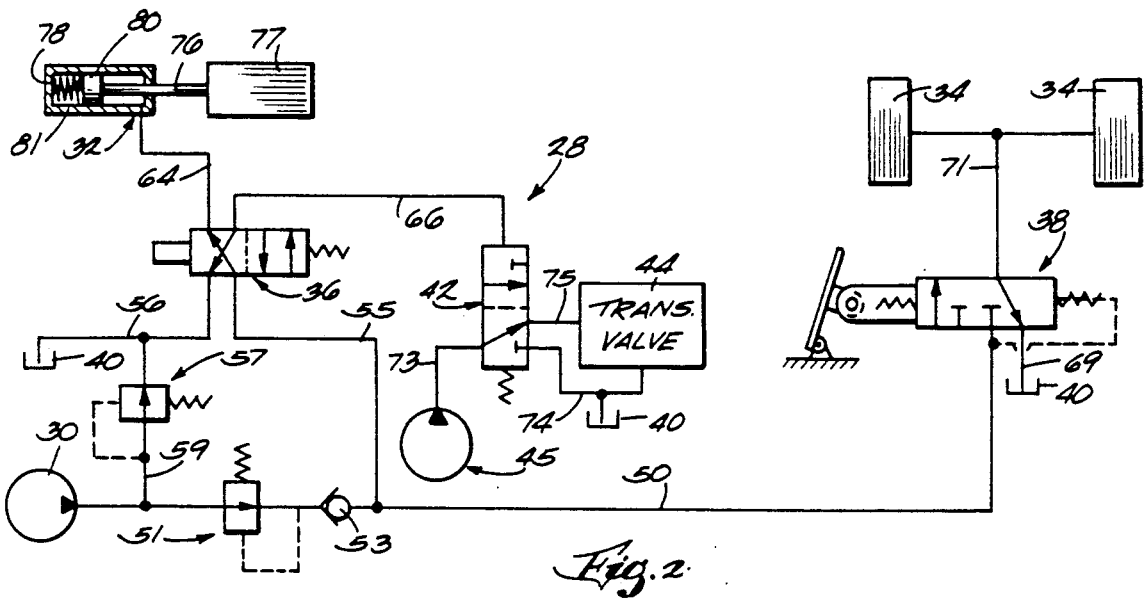
FIG. 2 is a hydraulic braking system in accordance with the preferred embodiment of the invention.

FIG. 2 shows a brake system 28 according to the preferred embodiment of the invention as applied to the wheels 14. The system includes a main pump 30 which provides a source of hydraulic pressure, a parking brake means 32 and a service brake means 34, both mechanically coupled to the wheels 14 and hydraulically coupled to the main pump 30. In the illustrated embodiment, the parking brake is spring actuated and released by operation of a first valve means 36. In addition, a pedal actuated valve means 38 is operative for selectively coupling the service brakes 34 to the pump 30 or to a reservoir 40. A pressure operated transmission disconnect valve means 42 is coupled to the first valve means 36 and is operative when pressurized to uncouple a transmission valve 44 from a transmission pump 45. This prevents the vehicle from being driven if the parking brake is set while the motor is running. In addition, the service brake valve means 38 is coupled to the parking brake means 32 such that stored hydraulic pressure can be applied to the service brakes 34 and as pressured is released from parking brake 32 in the event that the main pump 30 becomes deactivated as the result of an engine failure or otherwise.

Referring now to the system 28 more specifically, the first valve means 36 may be a four-way solenoid operated, spring biased valve. The service brake valve means 38 may be pedal operated from a first to a second position and spring biased for return movement to its first position.

A conduit 50 is shown in FIG. 2 to be connected to the outlet of pump 30. Interposed in conduit 50 is a pressure reducing valve 51 and a check valve 53 which prevents return flow to the pump 30 from either the parking brake 32 or the service brake 34. A conduit 55 connects conduit 50 to one port of four-way valve 36 and a second conduit 56 connects a second port of valve 36 to the reservoir 40. A sequencing valve 57 is coupled in conduit 59 between conduits 50 and 56 to permit fluid from the pump outlet to be bypassed directly to the reservoir 40.

A third port of valve 36 is connected to parking brake means 32 by conduit 64, and conduit 66 connects a fourth port of valve 36 to the transmission valve 42. Conduit 50 is also coupled to one port of pedal brake valve 38 and a second port of valve 38 is connected to the reservoir 40 by conduit 69. The third port of pedal brake valve 38 is connected to the service brakes 34 by conduit 71.

The transmission pump 45 is connected to a first port of transmission disconnect valve 42 by a first conduit 73 and second and third ports of valve 42 are connected to transmission valve 44 by conduits 74 and 75, respectively. As indicated above, conduit 66 connects a fourth port of valve 42 to a port of valve 36.

The parking brake 32 may have any conventional form, but in the illustrated embodiment is shown to include a mechanical connector 76 operatively connected to the brake assembly 77 and a spring 78 which urges the connector 76 in a direction tending to set the brake assembly 77. A piston 80 and cylinder 81 are also coupled to the connector 76 and are operative upon being pressurized to release the brake and compress the operating spring 78.

FIG. 2 shows the system 28 in a normal operating mode, that is, with the parking brake off, the pedal brake valve 38 not actuated and the pump 30 operating. In this situation, the four-way solenoid valve 36 is energized so that the pump outlet conduit 50 is pressurized and connected to the parking brake cylinder 81 through conduit 64 so that the spring 78 is compressed. In addition, the transmission disconnect valve 42 is connected by conduit 66 and 56 to the reservoir 40 so that transmission disconnect valve 42 connects the transmission pump 45 to the transmission valve 44. Also, the service brake 34 is also connected to the reservoir 40 through conduits 69 and 71. As a result, the vehicle 10 can operate in a normal manner.

Figure 3:
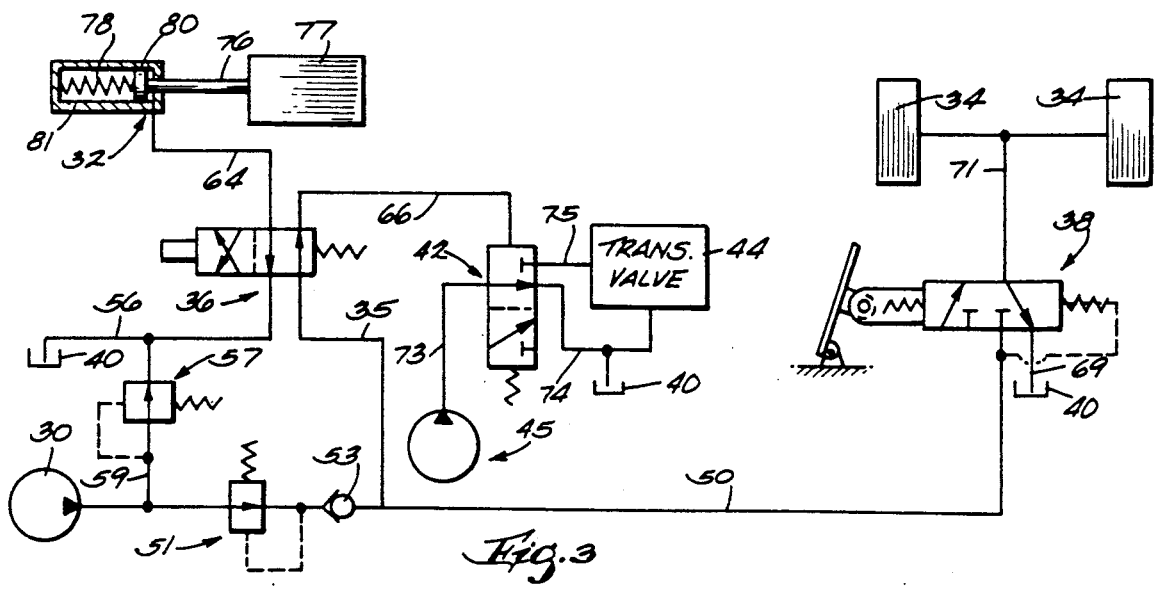
FIG. 3 shows the braking system of FIG. 2 in an alternate operating mode.

In the event it is desired to set the parking brake, the four-way solenoid valve 36 is de-energized and is spring biased from its position shown in FIG. 2 to its position shown in FIG. 3. This connects the cylinder 81 to the reservoir 40 through conduits 64 and 56 and valve 36. As a result, the spring 78 moves the connector 76 into a position which sets the parking brake assembly 77. In addition, the pressure line 50 from pump 30 is connected to transmission disconnect valve 42 through conduits 55 and 66 and valve 36 whereby the valve 42 is operated to its position shown in FIG. 3 to disconnect the transmission valve 44 from pump 45 and to connect the pump 45 to the reservoir 40 through conduits 73 and 74 and valve 42. Under these circumstances, the vehicle engine is disconnected from the wheels 14 so that the operator cannot drive the vehicle while the parking brake is set. This eliminates inordinate wear on the brakes which would otherwise occur should the vehicle be driven with the brake set.

The system 28 according to the invention permits the operation of either the parking brake 32 or the service brake 34 should there be a loss of hydraulic pressure in the event of an engine failure whereby the main pump is not driven. If there is engine failure or failure of the main pump 30 when the system is operating as shown in FIG. 2, the check valve 53 will maintain hydraulic fluid pressure in cylinder 81 and hold the parking brake 32 off until the operator either turns off the key or applies the manual brake switch. If the key is turned off or the switch applied, the four-way solenoid valve 36 will be de-energized and moved to its mode shown in FIG. 3. This will vent the cylinder 81 to the reservoir 40 so that the parking brake assembly 77 will be set by the spring 78.

On the other hand, the operator may alternately operate the service brake 34 after an engine failure. In this situation, operation of the pedal brake valve 38 will connect the service brakes 34 to the cylinder 81 through conduits 71, 50, 55 and 64. Hydraulic fluid under pressure of the spring 78 and within cylinder 81 can flow through conduit 64, 55 and 50, pedal valve 38 and conduit 71 so that the service brakes can be operated. This actuation of the service brakes also permits movement of piston 80 and rod 76 to the parking brake actuating position. Check valve 53 prevents reverse fluid flow to pump 30.

While only a single embodiment of the invention has been illustrated and described, it is not intended to be limited thereby, but only by the scope of the appended claims.

I claim:

1. Brake means for a vehicle having a transmission means, said brake means including a source of hydraulic pressure, parking brake means having a set mode and a released mode, a first valve means for coupling and uncoupling said parking brake means to said pressure source, said first valve means having a first mode for setting said parking brake means and a second mode for releasing said parking brake means, second valve means coupled to said transmission means and to said first valve means and having a first mode for disabling the transmission means and a second mode for enabling the transmission means, said first valve means being operative for setting the second valve means in its first mode when said parking brake means is set and for setting said second valve means in its second mode when said parking brake means is released, said parking brake means includes a hydraulic cylinder for actuating said parking brake means to its released mode, hydraulically actuated brake means, third valve means for coupling said hydraulic pressure source to said hydraulically operated brake means, and means for connecting said hydraulic cylinder to said third valve means when said source of hydraulic pressure fails so that said hydraulically operated brake means may be operated by the hydraulic pressure in said cylinder.

2. The system set forth in claim 1 wherein said hydraulic cylinder is operative to maintain the parking brake means in its second mode and means for biasing said parking brake means into its first mode, said first valve means being electrically operable into its first mode and being biased into its second mode wherein said parking brake means will be set in the event said first valve means is de-energized.

3. The system set forth in claim 1 wherein said hydraulic cylinder is operative to maintain the parking brake means in its second mode and means for biasing said parking brake means into its first mode, said first valve means being electrically operable into its first mode and being biased into its second mode wherein said parking brake means will be set in the event said first valve means is de-energized.

4. The brake means set forth in claim 3 and including second check valve means for preventing fluid flow from said hydraulic cylinder means to said source of hydraulic pressure.

5. Brake means for a vehicle including a source of hydraulic pressure, parking brake means having a set mode and a released mode, first valve means for coupling and uncoupling said parking brake means to said hydraulic pressure source, said first valve means having a first mode for setting said parking brake means and a second mode for releasing said parking brake means, said parking brake means including a hydraulic cylinder for setting said parking brake means, hydraulically operated brake means, second valve means for coupling said hydraulic pressure source to said hydraulically operated brake means, means connecting said hydraulic cylinder to said second valve means when said source of hydraulic pressure fails so that said hydraulically operated brake means may be actuated, said hydraulic cylinder being operative to maintain the parking brake in its released mode and biasing means for biasing said parking brake into its set mode, said first valve means being electrically operable into its first mode and being biased into its second mode whereby said parking brake means will be set in the event said first valve means is de-energized.

6. The brake means set forth in claim 5 and including check valve means for preventing fluid flow from said hydraulically operated brake means to said source of hydraulic pressure.

7. Brake means for a vehicle including a source of hydraulic pressure, parking brake means including a hydraulic cylinder means having a first mode for setting said brake means and a second mode for releasing said brake means, first valve means for coupling and uncoupling said hydraulic cylinder means relative to said hydraulic pressure source, said first valve means having a first mode for setting said parking brake means and a second mode for releasing said parking brake means, hydraulically operated brake means, second valve means for selectively coupling and uncoupling said hydraulic pressure source relative to said hydraulically operated brake means, and means connecting said hydraulic cylinder means to said second valve means, said second valve means also being operable for selectively coupling and uncoupling said hydraulically operated brake means relative to said hydraulic cylinder means whereby said hydraulically operated brake means may be actuated by the pressure in said hydraulic cylinder means if the hydraulic pressure source fails.

8. The brake means set forth in claim 7 wherein said hydraulic cylinder means includes biasing means for biasing said parking brake toward setting of said brake means, said biasing means maintaining pressure in said hydraulic cylinder means in the event of a failure of said hydraulic pressure source.

9. The brake system set forth in claim 8 wherein said hydraulic cylinder means includes piston means responsive to pressure within said cylinder means to release said parking brake means, said biasing means acting against said piston means for setting said parking brake means in the absence of hydraulic pressure.

10. The brake system set forth in claim 8 wherein said first valve means being electrically operable into its first mode and being biased into its second mode whereby said parking brake means will be set in the event said first valve means is de-energized.

11. The brake system set forth in claim 9 and including check valve means for preventing fluid flow from said hydraulically operated brake means to said source of hydraulic pressure.

12. Brake means for a vehicle, said brake means including a source of hydraulic pressure, parking brake means having a first mode in which said brake means is set and a second mode in which said brake means is released, a hydraulic cylinder means for actuating said parking brake means to its second mode, a first valve means for coupling and uncoupling said hydraulic cylinder means relative to said pressure source, said first valve means having a first mode for setting said parking brake means and a second mode for releasing said parking brake means, hydraulically actuated brake means, second valve means for coupling and uncoupling said hydraulic pressure source relative to said hydraulically operated brake means, said second valve means also being operative for connecting said hydraulic cylinder means to said hydraulically operated brake means in said cylinder means when said source of hydraulic pressure so that said hydraulically operated brake means may be operated by the hydraulic pressure fails.

13. The system set forth in claim 12 wherein said hydraulic cylinder means is operative to maintain the parking brake means in its second mode and means for biasing said parking brake means into its first mode, said biasing means pressurizing said hydraulic cylinder means in the event of a failure of said hydraulic pressure source.

14. The brake means set forth in claim 13 wherein said hydraulic cylinder means includes piston means responsive to pressure within said hydraulic cylinder means to release said parking brake means, said biasing means acting against said piston means for setting said parking brake means in the absence of hydraulic pressure.

15. The brake means set forth in claim 14 and including check valve means for preventing fluid flow from said hydraulic cylinder means to said source of hydraulic pressure.

16. The brake means set forth in claim 12 wherein said first valve means is electrically operable into its first mode and being biased into its second mode wherein said parking brake means will be set in the event said first valve means is de-energized.

17. Brake means for a vehicle including a source of hydraulic pressure, parking brake means including a hydraulic cylinder means operative when pressurized to release said brake means and when depressurized to set said brake means, first valve means having first and second modes for respectively coupling and uncoupling said hydraulic cylinder means to said hydraulic pressure source, hydraulically operated brake means, second valve means for coupling and uncoupling said hydraulically operated brake means relative to said hydraulic pressure source, operating means for selectively actuating said second valve means, said second valve means also being operative when actuated for connecting said hydraulic cylinder means to said hydraulically operated brake means so that said hydraulically operated brake means may be actuated by the pressure within said hydraulic cylinder means when said source of hydraulic pressure fails.

18. The brake means set forth in claim 17 and including biasing means for biasing said parking brake means toward setting of said brake means and for maintaining pressure within said hydraulic cylinder means upon the failure of said hydraulic pressure.

19. The brake means set forth in claim 18 and including check valve means for preventing fluid flow from said hydraulically operated brake means to said source of hydraulic pressure.

* * * * *